US012602598B2

(12) United States Patent
Silva

(10) Patent No.: US 12,602,598 B2
(45) Date of Patent: Apr. 14, 2026

(54) INDEX FOR RISK OF NON-ADHERENCE IN GEOGRAPHIC REGION WITH PATIENT-LEVEL PROJECTION

(71) Applicant: IQVIA Inc., Durham, NC (US)

(72) Inventor: Arturo Silva, Princeton, NJ (US)

(73) Assignee: IQVIA INC., Durham, NC (US)

( * ) Notice: Subject to any disclaimer, the term of this patent is extended or adjusted under 35 U.S.C. 154(b) by 995 days.

(21) Appl. No.: 17/824,351

(22) Filed: May 25, 2022

(65) Prior Publication Data

US 2023/0409926 A1     Dec. 21, 2023

(51) Int. Cl.
G06N 5/022          (2023.01)

(52) U.S. Cl.
CPC .................................... G06N 5/022 (2013.01)

(58) Field of Classification Search
CPC ...................................................... G06N 5/022
See application file for complete search history.

(56) References Cited

U.S. PATENT DOCUMENTS 11,196,656 B1 * 12/2021 Jain ......................... H04L 43/50
2017/0039325 A1 * 2/2017 Dorsett ................... G16H 40/67

2018/0052967 A1 * 2/2018 Boomershine ......... G16H 20/00
2020/0035360 A1 * 1/2020 Vest ......................... G06N 5/01
2021/0098133 A1 * 4/2021 Chowdhry ............. G16H 50/70
2022/0084633 A1 * 3/2022 Das ......................... G16H 50/20
2022/0319643 A1 * 10/2022 Skees ..................... G16H 40/20

* cited by examiner

*Primary Examiner* — Jay M. Patel

(74) *Attorney, Agent, or Firm* — Troutman Pepper Locke LLP

(57) ABSTRACT

Methods and systems to train and use an ensemble of artificial intelligence/machine learning (AI/ML) models to extract information from social determinants of health (SDoH), including training each of multiple dimensionality reduction models to reduce dimensionality of socio-demographic variables associated with a respective one of multiple SDoH categories, training a predictive model to predict a patient behavior for a geographic region (e.g., risk of non-adherence to treatment regimens) based on dimensionally reduced SDoH (alone or in combination with selected socio-demographic variables and/or other data), training a patient classification model to classify patients based on prescription transactions, and/or training a regional similarity model to determine a measure of similarity between geographic regions based on SDoH and/or dimensionally reduced SDoH. Also disclosed are techniques to visually represent outputs of the models on a user-interactive display.

24 Claims, 7 Drawing Sheets

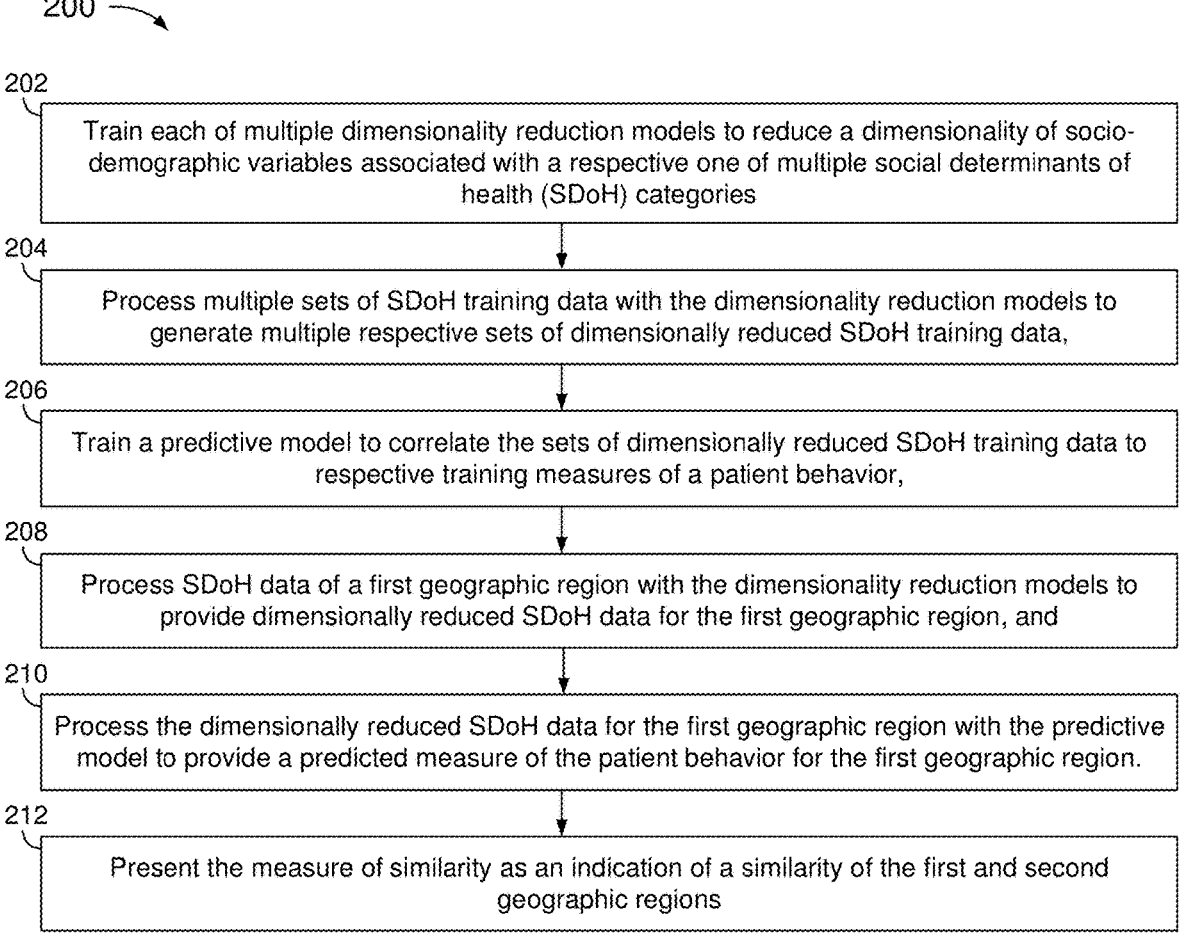

200

202

Train each of multiple dimensionality reduction models to reduce a dimensionality of socio-demographic variables associated with a respective one of multiple social determinants of health (SDoH) categories

204

Process multiple sets of SDoH training data with the dimensionality reduction models to generate multiple respective sets of dimensionally reduced SDoH training data,

206

Train a predictive model to correlate the sets of dimensionally reduced SDoH training data to respective training measures of a patient behavior,

208

Process SDoH data of a first geographic region with the dimensionality reduction models to provide dimensionally reduced SDoH data for the first geographic region, and

210

Process the dimensionally reduced SDoH data for the first geographic region with the predictive model to provide a predicted measure of the patient behavior for the first geographic region.

212

Present the measure of similarity as an indication of a similarity of the first and second geographic regions

FIG. 2

INDEX FOR RISK OF NON-ADHERENCE IN GEOGRAPHIC REGION WITH PATIENT-LEVEL PROJECTION

BACKGROUND

Social determinants of health (SDoH) are economic and social conditions in which people are born, grow, work, live, and age, and the wider set of forces and systems shaping the conditions of daily life, that affect a wide range of health and quality-of life-risks and outcomes. These forces and systems include economic policies and systems, development agendas, social norms, social policies, and political systems. SDoH May Include, without Limitation:

ethnicity,
  unmet needs,
  cost of medications,
  cultural barriers,
  literacy barriers,
  food security/insecurity,
  housing,
  social isolation,
  transportation,
  education,
  income and social protection,
  employment, unemployment, job insecurity,
  working life conditions,
  housing, basic amenities, and the environment,
  early childhood development,
  social inclusion and non-discrimination,
  structural conflict, and
  access to affordable health services of decent quality.

Each of the foregoing SDoH types or categories may be characterized or defined by multiple socio-demographic variables. Thus, SDoH may be highly dimensional (e.g., tens, hundreds, or thousands of socio-demographic variables).

SDoH may impact patient behaviors, such as adherence to treatment regimens. It would be useful to analyze and/or extract information from SDoH, such as to identify or predict patient behavior from SDoH. Unfortunately, high-dimensionality SDoH is challenging to analyze in terms of computational complexity, processing resources, and time.

BRIEF DESCRIPTION OF THE DRAWINGS/FIGURES

FIG. 2 is a flowchart of a method of training and utilizing an ensemble of AI/ML models, according to an embodiment.

Figure 1:
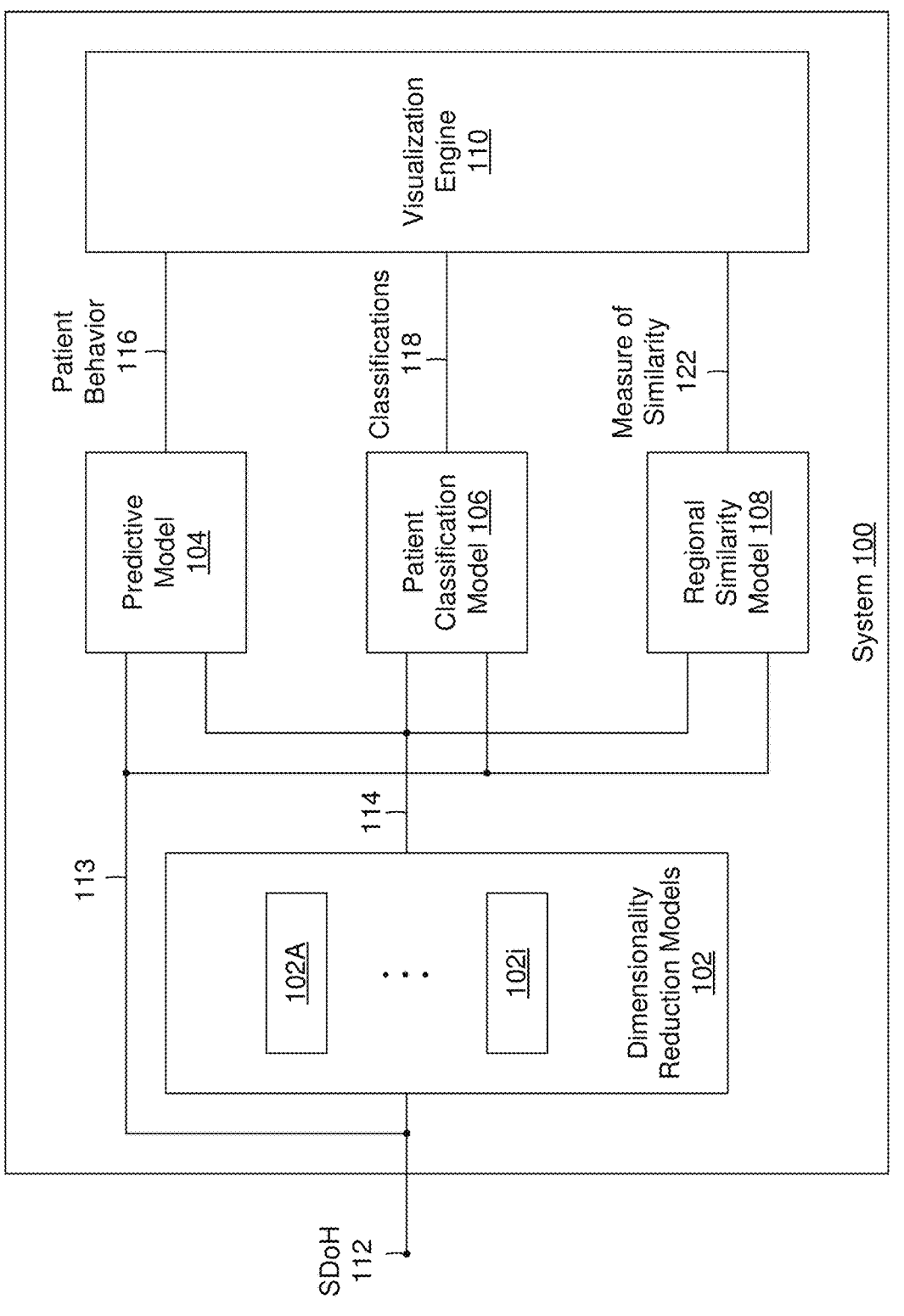
FIG. 1 is a block diagram of a system that includes an ensemble of artificial intelligence/machine learning (AI/ML) models trained with SDoH, according to an embodiment.

In the drawings, the leftmost digit(s) of a reference number identifies the drawing in which the reference number first appears.

DETAILED DESCRIPTION

Disclosed herein are techniques to utilize artificial intelligence/machine learning (AI/ML) to learn or extract information from SDoH, including to predict patient behavior from SDoH. Some examples are provided herein with respect to predicting risk of patient non-adherence to treatment regimens. Techniques disclosed herein are not, however, limited to predicting risk of patient non-adherence to treatment regimens. For example, and without limitation, techniques disclosed herein may be adapted to predict risk of attrition.

AI/ML may be used to learn (i.e., model or predict) patient behaviors from SDoH, alone or in combination with other information.

In an embodiment, one or more pre-processing or optimization features are utilized, which may improve accuracy of the AI/ML learning process and/or reduce computational complexity, resource consumption, and/or processing time.

In an embodiment, raw, high dimensionality SDoH is pre-processed to select a subset of SDoH (e.g., a subset of categories and/or a subset of socio-demographic variables) that has a greater a correlation to a patient behavior of interest. The subset of SDoH may be identified with, for example, regression-based analyses. AI/ML may then be applied to the subset of SDoH, alone and/or in combination with other data.

As another example, raw, high dimensionality SDoH or a subset thereof, may be pre-processed to reduce the dimensionality of the data.

Dimensionality reduction is a transformation of data from a high-dimensional space into a low-dimensional space so that the low-dimensional representation retains some meaningful properties of the original data, ideally close to its intrinsic dimension. Working in high-dimensional spaces may be undesirable for a variety of reasons. For example, raw data may be sparse, and analysis of the data may be computationally intractable (i.e., hard to control or deal with). Dimensionality reduction is useful in fields that deal with large numbers of observations and/or large numbers of variables, such as signal processing, speech recognition, neuroinformatics, and bioinformatics.

The dimensionality of the SDoH may be reduced across-the-board (i.e., by training a single model to reduce dimensionality of an entire SDoH set), or on a per-category basis (i.e., a separate dimensionality reduction model for each SDoH category). AI/ML may then be applied to the reduced-dimensionality data, alone and/or in combination with other data. Other data may include, without limitation, selected socio-demographic variables of the SDoH. Other data is not limited to the foregoing example. Additional examples are provided further below.

Pre-processing/optimization features disclosed herein may be utilized alone and/or in various combinations with one another.

FIG. 1 is a block diagram of a system 100 that includes an ensemble of artificial intelligence/machine learning (AI/ML) models trained with SDoH, according to an embodiment.

System 100 includes multiple dimensionality reduction models 102A-102i, each to reduce the dimensionality of socio-demographic variables of a respective category of SDoH 112.

System 100 further includes a predictive model 104 to predict a patient behavior 116 based on dimensionally reduced SDoH 114. Predictive model 104 may predict patient behavior 116 based solely on dimensionally reduced SDoH 114 or based on a combination of dimensionally reduced SDoH 114 and other data.

Other data may include selected variables 113 of SDoH 112. Alternatively, or additionally, other data may include patient-level data aggregated to a suitable level, such as data that identifies risk factors reported for patients (e.g., Z-score claims data that identifies risk factors reported for patients). Patient-level data may be available for a relatively small subset of patients.

Predicted patient behavior 116 may include risk of non-adherence to treatment regimens.

Predicted patient behavior 116 may be specific to a geographic region (e.g., a postal ZIP code).

In an embodiment, predicted patient behavior 116 is, or includes as an index indicative of the patient behavior (e.g., an index indicative of a risk of patient non-adherence to treatment regimens).

The index may be a geographic-based index (e.g., a zip-code level index) that identifies the risk of non-adherence that patients associated with that location present. The index may range from 0 to 100 and may specify how much patients in the geography are at risk of not adhering to prescribed medications based on socio-demographic attributes of the location and on SDoH related Z codes of the patients (e.g., pertinent ICD-10-CM encounter reason codes). In an embodiment, an index of 100 corresponds to a highest level of risk of non-adherence.

The index may be useful to provide insight to patient adherence rates (e.g., proportion of medication adherence patients), based on socio-demographic factors and geographic location. When data is available for a particular patient, the index may be useful to provide insight regarding the particular patient.

The index may be useful to permit unbiassed and equitable comparisons of outlets (e.g., pharmacies) while considering different data levels of granularity.

There is currently no index of risk of patient non-adherence to treatment regimens that is comprehensive, comparable, explicitly designed, and explainable by the factors used to generate the index.

Ascertained risks may be proportional, which may help making locations comparable.

Predicted risk of non-adherence to treatment regimens may be useful as measurement to aid in determining performance of retail pharmacies and/or as a factor to decide on interventions, resource allocation, and other issues facing retailers.

Adherence to treatment regiments may impact retail pharmacies financially. Pharmacies may, for example, be incentivized through risk-based contracts and other programs to help improve their ratings as they impact ratings of health plans.

Adherence to treatment regimen may computed as a proportion of days covered (PDC) by a prescription. PDC may be computed as:

$$PDC = Days\ covered/Available\ days\ in\ a\ measurement\ period.$$

PDC may be computed based on prescription transactions, which may be ascertained from pharmacy records and/or insurance claims.

A PDC threshold to be considered adherent may be determined based on a level above which a medicine has a reasonable likelihood to achieve the most clinical benefit. A PDC threshold may be set at, for example, 80% and can vary by therapy.

Predictive model 104 is comprehensive in the set of variables explored (including the totality of the ones that comprise the Social Vulnerability Index and widely accepted Social Determinants of Health as well as individual patients' Z codes), and precise in the target used (adherence) and flexible and explainable in its configuration (using a Scorecard framework approach that has been enhanced through an ensemble of Machine/Deep Learning Models). Predictive model 104 may be built considering a given geography (e.g., ZIP codes), and enriched with data of individual patients. Predictive model 104 may enable standardized measurements and comparisons.

System 100 further includes a patient classification model 106 to classify individual patients as as-risk or not at risk for the patient behavior based on prescription transaction information, which may be extracted from pharmacy records and/or insurance claims.

System 100 further includes a regional similarity model 108 to determine a measure of similarity 122 between geographic regions based on socio-demographic information of the respective regions.

System 100 further includes a visualization engine 110 to present outputs of predictive model 104, classification model 108, and/or regional similarity model 108 on a user-interactive display.

Example techniques to train and use the ensemble of AI/ML models of system 100 are provided below.

FIG. 2 is a flowchart of a method 200 of training and utilizing an ensemble of AI/ML models. Method 200 is described below with reference to FIGS. 1 and 3-6. Method 200 is not, however, limited to the examples of FIGS. 1 and 3-6.

Figure 3:
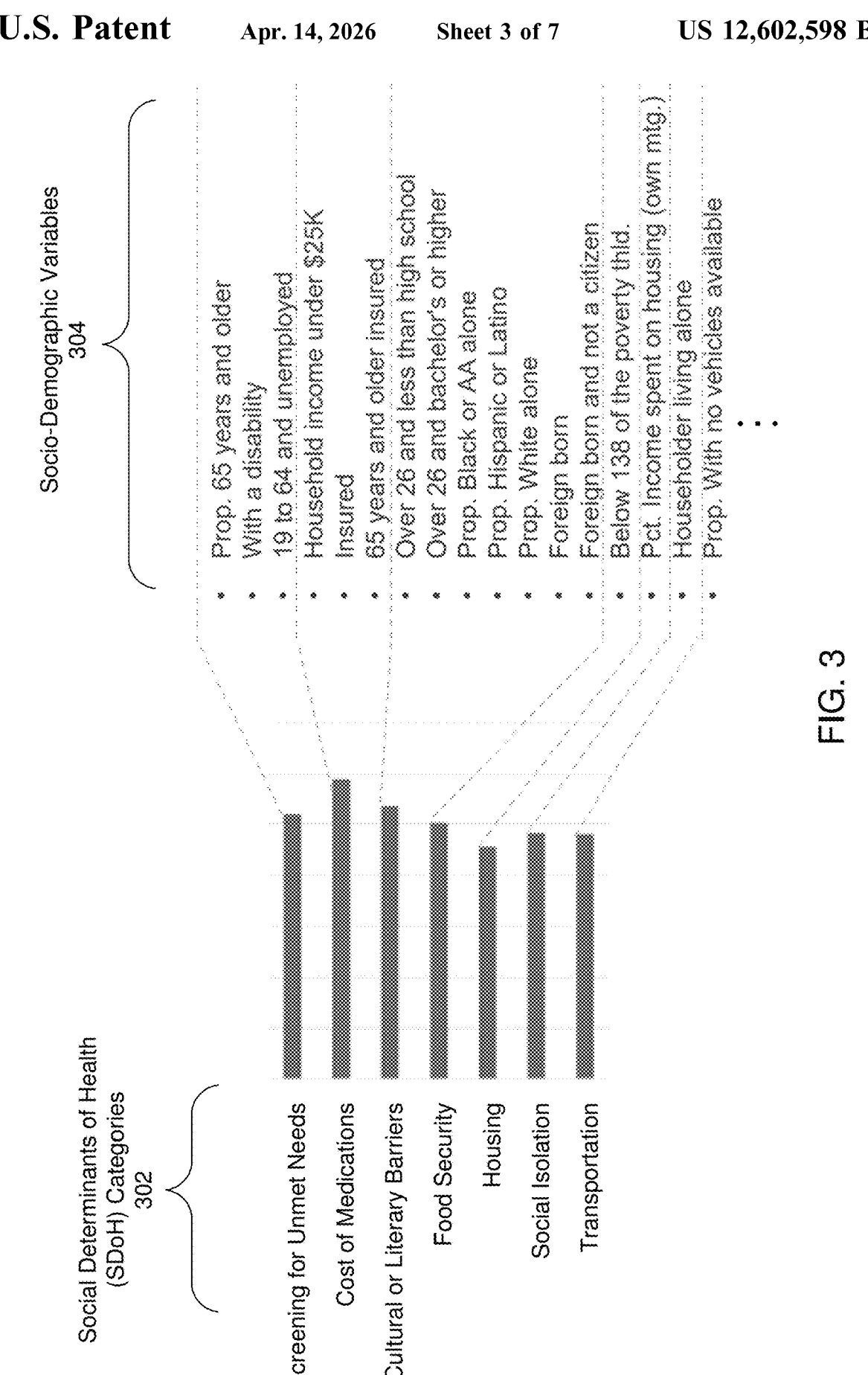
FIG. 3 illustrates example SDoH categories and corresponding socio-demographic variables.

FIG. 3 illustrates example SDoH categories 302 and corresponding socio-demographic variables 304. SDoH categories and socio-demographic variables are not limited to the examples of FIG. 3.

Figure 4:
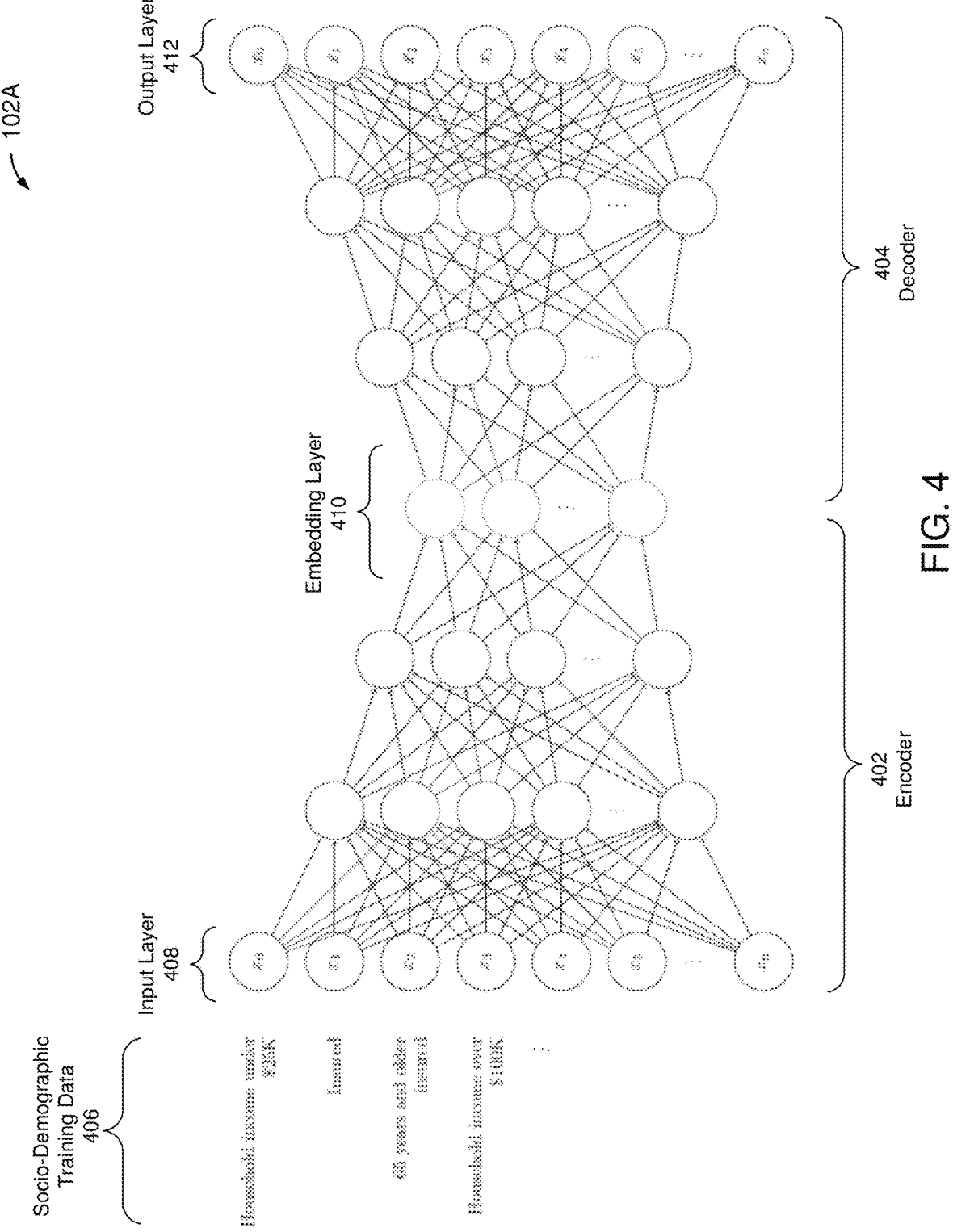
FIG. 4 illustrates an example embodiment of a dimensionality reduction model of FIG. 1, in a training phase, according to an embodiment.

FIG. 4 illustrates an example embodiment of dimensionality reduction model 102A of FIG. 1, in a training phase. In this example, dimensionality reduction model 102A includes an encoder 402 and a decoder 404. Decoder 404 is essentially a mirror image of encoder 402.

Figure 5:
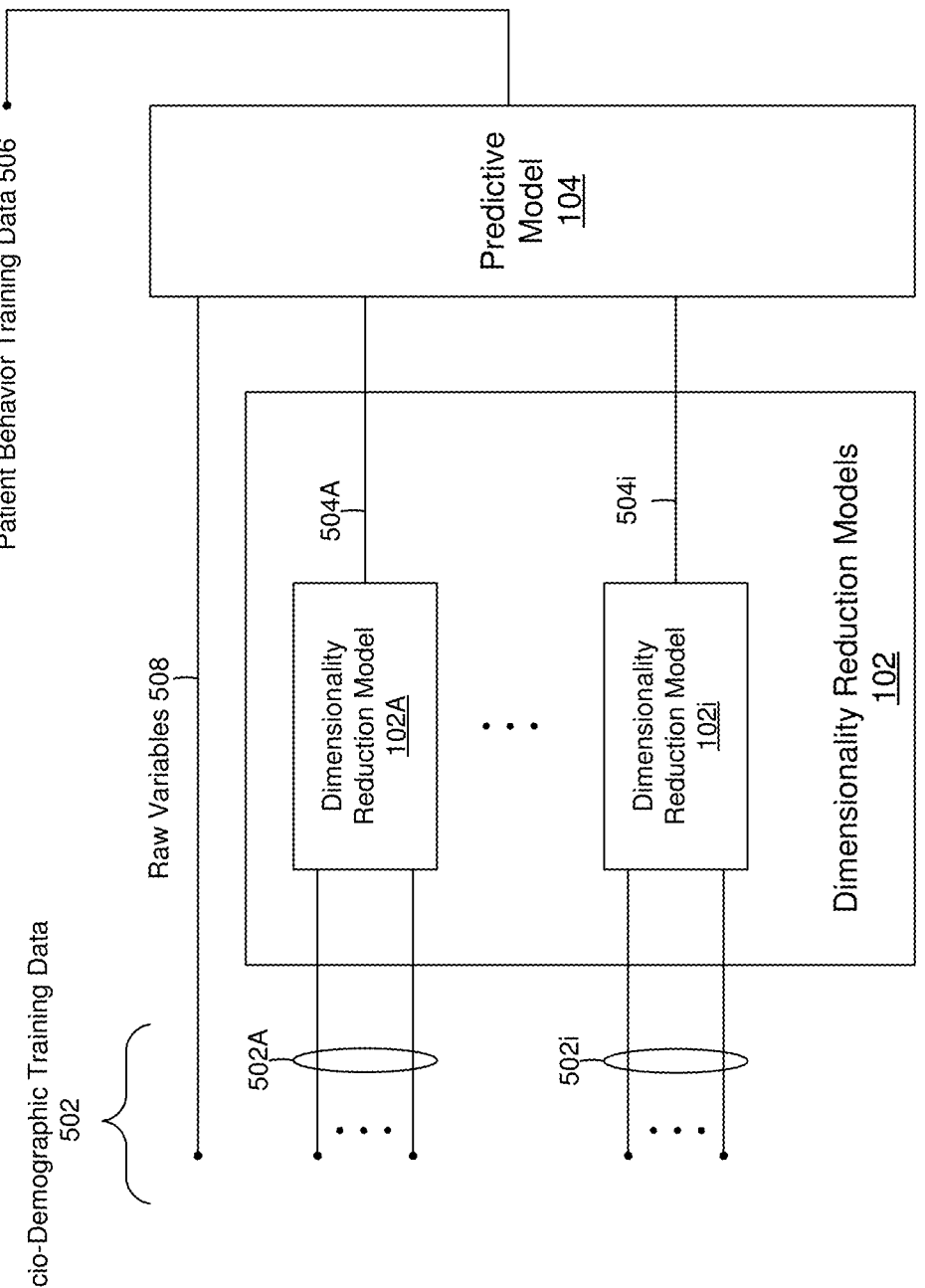
FIG. 5 is a block diagram of predictive model 104 in a training phase, according to an embodiment.

FIG. 5 is a block diagram of predictive model 104 in a training phase.

Figure 6:
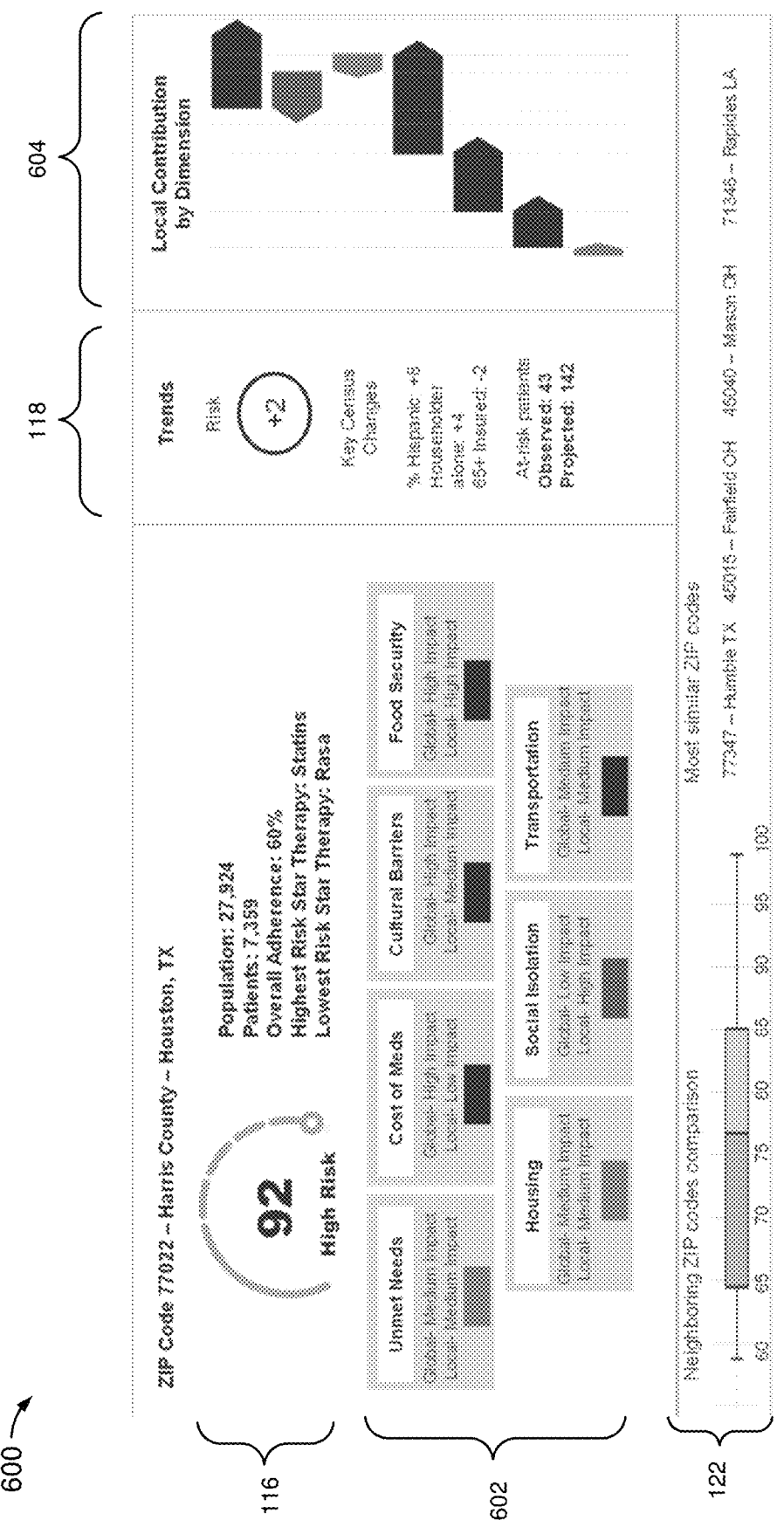
FIG. 6 illustrates a graphical user interface (GUI), according to an embodiment.

FIG. 6 illustrates a user-interactive display 600, according to an embodiment.

At 202 of FIG. 2, each of dimensionality reduction models 102A-102*i* is trained to reduce a dimensionality of socio-demographic variables associated with a respective category of SDoH. In an embodiment, dimensionality reduction models 102A-102*i* are trained to reduce the dimensionality from n inputs to m reduced dimensions (i.e., latent space), where m is determined empirically using decoder results to balance compression and the quality of the inputs reconstruction. Dimensionality reduction models 102 are not, however, limited to this example.

In FIG. 4, socio-demographic variables 406 associated with one of multiple categories of SDoH are presented to nodes of an input layer 408 of encoder 402 to generate dimensionally reduced values at nodes of an embedding layer 410 (latent space). The dimensionally reduced values are then processed by decoder 404 to generate embedding validation values at nodes of an output layer 412.

The socio-demographic variables 406 presented to input layer 408 are compared to the embedding validation values of output layer 412. Weights of encoder 402 and decoder 404 are tuned/adjusted until the embedding validation values of output layer 412 are sufficiently similar to the socio-demographic variables 406 presented to input layer 408. Training may be performed with multiple sets of socio-demographic training data 406.

At 204 of FIG. 2, SDoH training data is provided to trained encoder portions of dimensionality reduction models 102A-102*i* to generate dimensionally reduced SDoH training data.

In FIG. 5, socio-demographic training data is grouped into categories of SDoH training data 502A-502*i*. Each category of SDoH training data 502A-502*i* is provided to a respective one of dimensionality reduction models 102A-102*i* to provide dimensionally reduced SDoH training data 504A-504*i*.

Socio-demographic training data 502 may include the socio-demographic training data used to train dimensionality reduction models 102 (e.g., socio-demographic training data 406 in FIG. 4). Alternatively, other socio-demographic data may be used for socio-demographic training data 502.

Multiple sets of socio-demographic training data 502 may be applied to dimensionality reduction models 102 to generate multiple sets of dimensionally reduced SDoH training data 504A-504*i*.

At 206 in FIG. 2, AI/ML is used to train predictive model 104 to correlate dimensionally reduced training data 504A-504*i* (FIG. 5) to patient behavior training data 506. Patient behavior training data 506 is associated with socio-demographic training data 502. Patient behavior training data 506 may include a measure of patient behavior, such as a risk of non-adherence to treatment regimens.

In an embodiment, predictive model 104 is trained to correlate a combination of dimensionally reduced training data 504A-504*i* and other data, to patient behavior training data 506. The other data may include selectable socio-demographic variables 508.

In an embodiment, dimensionality reduction models 102 and/or predictive model 104 are trained with socio-demographic training data that is specific to a geographic region.

After dimensionality reduction models 102 and predictive model 104 are trained, they may be used to predict the patient behavior for a group of patients based on SDoH of the group of patients, such as described below with reference to 208 and 210.

At 208, dimensionality reduction models 102 (FIG. 1) process SDoH 112 of a first geographic region to provide dimensionally reduced SDoH 114 of the first geographic region.

At 210, predictive model 104 processes dimensionally reduced SDoH 114 of the first geographic region to predict patient behavior 116 for the first geographic region. Predictive model 104 may process dimensionally reduced SDoH 114 alone or in combination with other data, such as one or more selected variables of SDoH 112.

At 212, predicted patient behavior 116 for the first geographic region is presented in user-interactive display 600 in FIG. 6.

In the example of FIG. 6, user-interactive display 600 further includes visual representations 602 and 604 of socio-demographic variables of SDoH 112 and/or variables of dimensionally reduced SDoH 114 that have a relatively high impact/correlation to predicted patient behavior 116. Representations 602 may include colors and/or shapes to indicate relative measures of the correlations.

Patient classification model 106 of FIG. 1 is described below.

Patient classification model 106 may be trained to classify individual patients as as-risk or not at risk for the patient behavior (e.g., risk of non-adherence to treatment regimens) based on prescription transaction information, which may be extracted from pharmacy records and/or insurance claims.

Patient classification model 106 may be trained with positive example-based machine learning.

Patient classification model 106 may be trained based on relatively few patients for whom additional data is available (e.g., additional data collected from the patient at a doctor office).

Patient classification model 106 may be trained based on patients known to be at high risk-of non-adherence to treatment regimens such as patients facing economic difficulties/challenges (e.g., extreme poverty). These patients may be referred to herein as positive patients Training of patient classification model 106 may include identifying people who have relatively low risk of non-adherence (i.e., most distant from the high-risk patients). These patients may be referred to herein as negative cases. In this example, patient classification model 106 may be trained to distinguish between the positive and negative patients. The model may be used to classify other patients. This may be done in a supervised fashion, which may include adjusting a threshold to distinguish between positive and negative patients. Such training may be referred to herein as supervised classification.

In FIG. 6, user-interactive display 600 includes classifications 118 of patient classification model 106.

Regional similarity model 108 of FIG. 1 is described below.

Regional similarity model 108 is trained to determine a measure of similarity 122 between geographic regions based on socio-demographic information of the respective regions.

Regional similarity model 108 may be trained to determine measure of similarity 122 based on raw SDoH 112, dimensionally reduced SDoH 114, or a combination thereof.

Regional similarity model 108 may be trained to identify the geographic regions as similar to one another based on the measure of similarity and a threshold.

In an embodiment, predictive model 104 determines predicted patient behavior 116 for a first geographic region, and regional similarity model 108 determines similarity measure 133 between the first geographic region and a second geographic region.

In FIG. 6, user-interactive display 600 includes measure of similarity 122.

Additional examples are provided below.

Regarding data gathering, tens, hundreds, or thousands of scoring variables may be considered for use in training and using the ensemble of AI/ML models of FIG. 1. Sources may include census variables from the American Community Survey (by ZCTA, converted to ZIP), Vulnerability Index variables as developed by the Agency for Substances and Disease Registry within the Centers for Disease Control (e.g., by ZCTA converted to ZIP). Sources may include patient insurance claims that are pertinent to SDoH, aggregated (e.g., by zip code) and/or individually. A target variable may include a ratio of adherent individuals by ZIP code computed with patient data and PDC.

Regarding data transformation, an iterative process may be used to determine if the relationship of scoring variables to adherence proportions is monotonic, measure the strength of the relationship, and identify a cut-off point(s) for levels of the variables.

Regarding feature analysis and integration, method 200 may include computing and grouping variables' Information Value by SDoH dimension (global explanatory feature). Method 200 may further include developing embeddings (e.g., low dimensional, learned vector representations), that characterize each of the SDoH dimensions of analysis using a deep neural network approach.

Regarding model development and risk profiling, method 200 may include developing an ensemble model whose first layer may be initialized with Information Value aggregated weights for each embedding category. Method 200 may further include predicting targets (risk profiles) and creating Shapley Additive Explanations analysis (local explanatory feature).

Regarding risk profile visualization, method 200 may include presenting trends, SDoH dimension importance, local and global level explanations for the model and the specific ZIP code score, and/or patient proportion insights including a projection of patients at risk (e.g., Positive Example Based Learning).

In an embodiment, system 100 and/or method 200 incorporate or utilize feedback with other variables, such as by re-scoring and through interface feedback.

One or more features disclosed herein may be implemented in, without limitation, circuitry, a machine, a computer system, a processor and memory, a computer program encoded within a computer-readable medium, and/or combinations thereof. Circuitry may include discrete and/or integrated circuitry, application specific integrated circuitry (ASIC), a system-on-a-chip (SOC), and combinations thereof.

Information processing by software may be concretely realized by using hardware resources.

Figure 7:
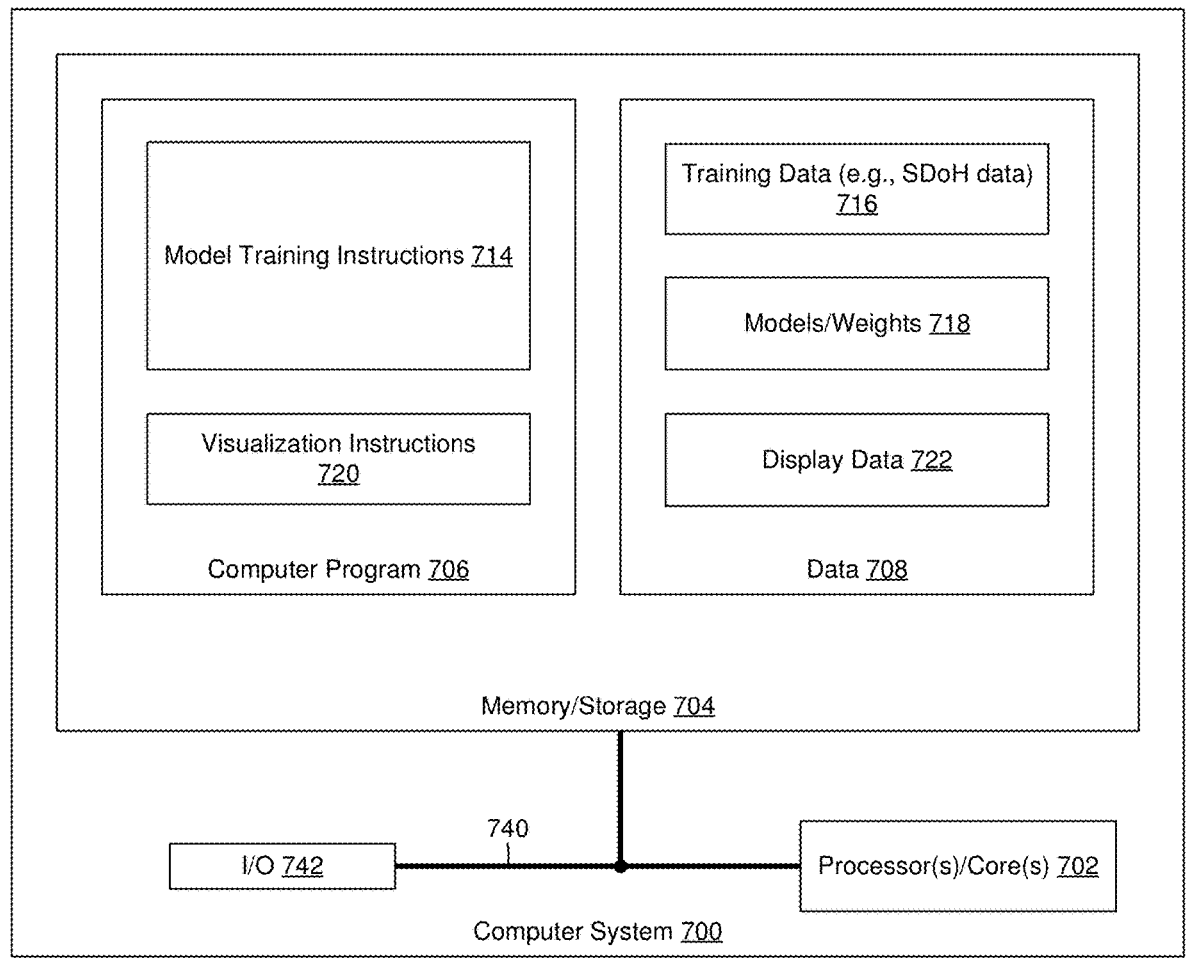
FIG. 7 is a block diagram of a computer system configured to train and utilize an ensemble of AI/ML models based on SDoH.

FIG. 7 is a block diagram of a computer system 700, configured to train and utilize an ensemble of AI/ML models based on SDoH, according to an embodiment. Computer system 700 may represent an example embodiment or implementation of system 100 in FIG. 1.

Computer system 700 includes one or more instruction processors, illustrated here as a processor 702, to execute instructions of a computer program 706 encoded within a computer-readable medium 704. Computer-readable medium 704 further includes data 708, which may be used by processor 702 during execution of computer program 706, and/or generated by processor 702 during execution of computer program 706.

Computer-readable medium 704 may include a transitory or non-transitory computer-readable medium.

In the example of FIG. 7, computer program 706 includes model training instructions 710 to cause processor 702 to train dimensionality reduction models 102, predictive model 104, patient classification model 106, and regional similarity model 108 (collectively illustrated here as models/weights 718), based on training data 716, such as described above with respect to method 200 in FIG. 2.

Computer program 706 further includes visualization instructions 720 to cause processor 702 to present predicted patient behavior 116, classifications 118, and measure of similarity 122 (collectively illustrated here as display data 722), on a user-interactive display, such as illustrated in FIG. 6.

Computer system 700 may include communications infrastructure 740 to communicate amongst devices and/or resources of computer system 700.

Computer system 700 may include one or more input/output (I/O) devices and/or controllers 742 to interface with one or more other systems, such as to receive/collect SDoH 112 in FIG. 1 and/or to provide display data 722 to a display.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What is claimed is:

1. An apparatus, comprising:
a processor and memory configured to train and utilize an ensemble of artificial intelligence/machine learning (AI/ML) models, including to,
train each of multiple dimensionality reduction models to reduce a dimensionality of socio-demographic variables associated with a respective one of multiple social determinants of health (SDoH) categories,
process multiple sets of SDoH training data with the dimensionality reduction models to generate multiple respective sets of dimensionally reduced SDoH training data,
train a predictive model to correlate the sets of dimensionally reduced SDoH training data to respective training measures of a patient behavior,
process categories of SDoH of a first geographic region with respective ones of the dimensionality reduction models to provide dimensionally reduced SDoH of the first geographic region,
process the dimensionally reduced SDoH of the first geographic region with the predictive model to provide a predicted measure of the patient behavior for the first geographic region, and
present a visual indication of the predicted measure of the patient behavior on a user-interactive display.

2. The apparatus of claim 1, wherein the processor and memory are further configured to:
train the predictive model based further on one or more socio-demographic variables of the respective sets of SDoH training data.

3. The apparatus of claim 1, wherein the processor and memory are further configured to:
train the predictive model based further on patient-level data that identifies risk factors reported for patients.

4. The apparatus of claim 1, wherein the processor and memory are further configured to:
determine a relative contribution of one or more of the categories of SDoH of the first geographic region and of one or more of the socio-demographic variables of the SDoH of the first geographic region, to the predicted measure of the patient behavior; and
present a visual indication of the relative contribution on the user-interactive display.

5. The apparatus of claim 1, wherein the processor and memory are further configured to:
process SDoH of a second geographic region with the dimensionality reduction models to provide dimensionally reduced SDoH of the second geographic region;
determine a measure of similarity between the first and second geographic regions based at least in part on the dimensionally reduced SDoH of the first and second geographic regions; and present a visual indication of the measure of similarity on the user-interactive identify the second geographic region as similar to the first geographic region, on the user-interactive display.

6. The apparatus of claim 1, wherein the predicted measure of the patient behavior includes a risk of non-adherence to treatment regimens, and wherein the processor and memory are further configured to:

train a classification model to identify individual patients as at-risk or not at-risk of non-adherence to treatment regimens based on prescription transactions of the patients, wherein the prescription transactions of the patient are determined from insurance claims.

7. The apparatus of claim 6, wherein the processor and memory are further configured to:

identify a second set of patients as not at risk of non-adherence based on dissimilarity of prescription transaction information of a first set of patients who are known to be at-risk of non-adherence to medical treatment regimens and demographic information of the second set of patients; and train the classification model to distinguish between the first and second sets of patients based on the prescription transaction information of the respective patients.

8. The apparatus of claim 7, wherein the processor and memory are further configured to:

use the classification model to identify other patients as at-risk of non-adherence to treatment regimens based on prescription transaction information of the respective other patients; and present a visual indication of the classifications of the other patients on the user-interactive display.

9. A non-transitory computer readable medium encoded with a computer program that comprises instructions to cause a processor to:

train each of multiple dimensionality reduction models to reduce a dimensionality of socio-demographic variables associated with a respective one of multiple social determinants of health (SDoH) categories;

process multiple sets of SDoH training data with the dimensionality reduction models to generate multiple respective sets of dimensionally reduced SDoH training data;

train a predictive model to correlate the sets of dimensionally reduced SDoH training data to respective training measures of a patient behavior;

process categories of SDoH of a first geographic region with respective ones of the dimensionality reduction models to provide dimensionally reduced SDoH of the first geographic region;

process the dimensionally reduced SDoH of the first geographic region with the predictive model to provide a predicted measure of the patient behavior for the first geographic region; and present a visual indication of the predicted measure of the patient behavior on a user-interactive display.

10. The non-transitory computer readable medium of claim 9, further comprising instructions to cause the processor to:

train the predictive model based further on one or more socio-demographic variables of the respective sets of SDoH training data.

11. The non-transitory computer readable medium of claim 9, further comprising instructions to cause the processor to:

train the predictive model based further on patient-level data that identifies risk factors reported for patients.

12. The non-transitory computer readable medium of claim 9, further comprising instructions to cause the processor to:

determine a relative contribution of one or more of the categories of SDoH of the first geographic region and of one or more of the socio-demographic variables of the SDoH of the first geographic region, to the predicted measure of the patient behavior; and present a visual indication of the relative contribution on the user-interactive display.

13. The non-transitory computer readable medium of claim 9, further comprising instructions to cause the processor to:

process SDoH of a second geographic region with the dimensionality reduction models to provide dimensionally reduced SDoH of the second geographic region;

determine a measure of similarity between the first and second geographic regions based at least in part on the dimensionally reduced SDoH of the first and second geographic regions; and present a visual indication of the measure of similarity on the user-interactive identify the second geographic region as similar to the first geographic region, on the user-interactive display.

14. The non-transitory computer readable medium of claim 9, wherein the predicted measure of the patient behavior includes a risk of non-adherence to treatment regimens, further comprising instructions to cause the processor to:

train a classification model to identify individual patients as at-risk or not at-risk of non-adherence to treatment regimens based on prescription transactions of the patients, wherein the prescription transactions of the patient are determined from insurance claims.

15. The non-transitory computer readable medium of claim 14, further comprising instructions to cause the processor to:

identify a second set of patients as not at risk of non-adherence based on dissimilarity of prescription transaction information of a first set of patients who are known to be at-risk of non-adherence to medical treatment regimens and demographic information of the second set of patients; and train the classification model to distinguish between the first and second sets of patients based on the prescription transaction information of the respective patients.

16. The non-transitory computer readable medium of claim 15, wherein the processor and memory are further configured to:

use the classification model to identify other patients as at-risk or not at-risk of non-adherence to treatment regimens based on prescription transaction information of the respective other patients; and present a visual indication of the classifications of the other patients on the user-interactive display.

17. A computing machine implemented method, comprising:

training each of multiple dimensionality reduction models to reduce a dimensionality of socio-demographic variables associated with a respective one of multiple social determinants of health (SDoH) categories;

processing multiple sets of SDoH training data with the dimensionality reduction models to generate multiple respective sets of dimensionally reduced SDoH training data;

training a predictive model to correlate the sets of dimensionally reduced SDoH training data to respective training measures of a patient behavior;

processing categories of SDoH of a first geographic region with respective ones of the dimensionality reduction models to provide dimensionally reduced SDoH of the first geographic region;

processing the dimensionally reduced SDoH of the first geographic region with the predictive model to provide a predicted measure of the patient behavior for the first geographic region; and presenting a visual indication of the predicted measure of the patient behavior on a user-interactive display.

18. The method of claim 17, wherein the training a predictive model comprises:

training the predictive model based further on one or more socio-demographic variables of the respective sets of SDoH training data.

19. The method of claim 17, wherein the training a predictive model comprises:

training the predictive model based further on patient-level data that identifies risk factors reported for patients.

20. The method of claim 17, further comprising:

determining a relative contribution of one or more of the categories of SDoH of the first geographic region and of one or more of the socio-demographic variables of the SDoH of the first geographic region, to the predicted measure of the patient behavior; and presenting a visual indication of the relative contribution on the user-interactive display.

21. The method of claim 17, further comprising:

processing SDoH of a second geographic region with the dimensionality reduction models to provide dimensionally reduced SDoH of the second geographic region;

determining a measure of similarity between the first and second geographic regions based at least in part on the dimensionally reduced SDoH of the first and second geographic regions; and presenting a visual indication of the measure of similarity on the user-interactive identify the second geographic region as similar to the first geographic region, on the user-interactive display.

22. The method of claim 17, wherein the predicted measure of the patient behavior includes a risk of non-adherence to treatment regimens, the method further comprising:

training a classification model to identify individual patients as at-risk of non-adherence to treatment regimens based on prescription transactions of the patients, wherein the prescription transactions of the patient are determined from insurance claims.

23. The method of claim 22, wherein the training a classification model comprises:

identifying a second set of patients as not at risk of non-adherence based on dissimilarity of prescription transaction information of a first set of patients who are known to be at-risk of non-adherence to medical treatment regimens and demographic information of the second set of patients; and training the classification model to distinguish between the first and second sets of patients based on the prescription transaction information of the respective patients.

24. The method of claim 23, further comprising:

using the classification model to identify other patients as at-risk of non-adherence to treatment regimens based on prescription transaction information of the respective other patients; and presenting a visual indication of the classifications of the other patients on the user-interactive display.

\* \* \* \* \*